United States Patent [19]

Neel

[11] 4,025,260

[45] May 24, 1977

[54] FOOD EXTRUSION DEVICE

[75] Inventor: William E. Neel, Archbold, Ohio

[73] Assignee: Beatrice Foods Co., Chicago, Ill.

[22] Filed: June 3, 1974

[21] Appl. No.: 475,578

[52] U.S. Cl. .......................... 425/131.1; 99/450.6; 425/302 R; 425/311; 426/143; 426/275; 426/283; 426/516

[51] Int. Cl.² ................. B30B 11/22; B30B 15/02

[58] Field of Search .......... 426/496, 500, 514, 501, 426/516, 502, 451, 314, 92, 94, 557, 275, 281, 283, 549, 565, 143; 425/133.1, 311, 192, 302; 99/353, 354, 450.6

[56] References Cited

UNITED STATES PATENTS

| | | | |
|---|---|---|---|
| 1,562,913 | 11/1925 | Pierce | 425/131.1 |
| 1,946,238 | 2/1934 | Ronzoni | 425/311 |
| 1,959,006 | 5/1934 | Penza | 426/143 |
| 2,029,684 | 2/1936 | Tanzi | 426/499 X |
| 2,569,373 | 9/1951 | Fay | 425/131.1 |
| 2,614,290 | 10/1952 | Street | 425/311 |
| 3,539,354 | 11/1970 | Colvin | 426/549 X |
| 3,541,946 | 5/1968 | Johnston | 425/133.1 |
| 3,568,251 | 3/1971 | Walker | 425/311 |
| 3,851,084 | 11/1974 | Rossen et al. | 426/502 X |

FOREIGN PATENTS OR APPLICATIONS 513,833   12/1930   Germany .............................. 426/94

OTHER PUBLICATIONS

Webster's New World Dictionary, D. B. Guralnik, Editor In Chief, Second College Edition, pub. by New World Pub. Co. 1972, p. 1636.

Primary Examiner—Frank W. Lutter
Assistant Examiner—N. Greenblum
Attorney, Agent, or Firm—Johnston, Keil, Thompson & Shurtleff

[57] ABSTRACT

A device for the production of a food article, in which food material is extruded through a generally arcuate die opening so that a differential in the frictional forces between the center portion and the end portions of the arcuate opening causes the material to curl about an axis transverse to the die axis and thus assume the general shape of a shell. The device lends itself to the fabrication, in an automatic, consistent and simple way, of a food product of a unique structure which has a filling of meat within a covering of dough.

3 Claims, 7 Drawing Figures

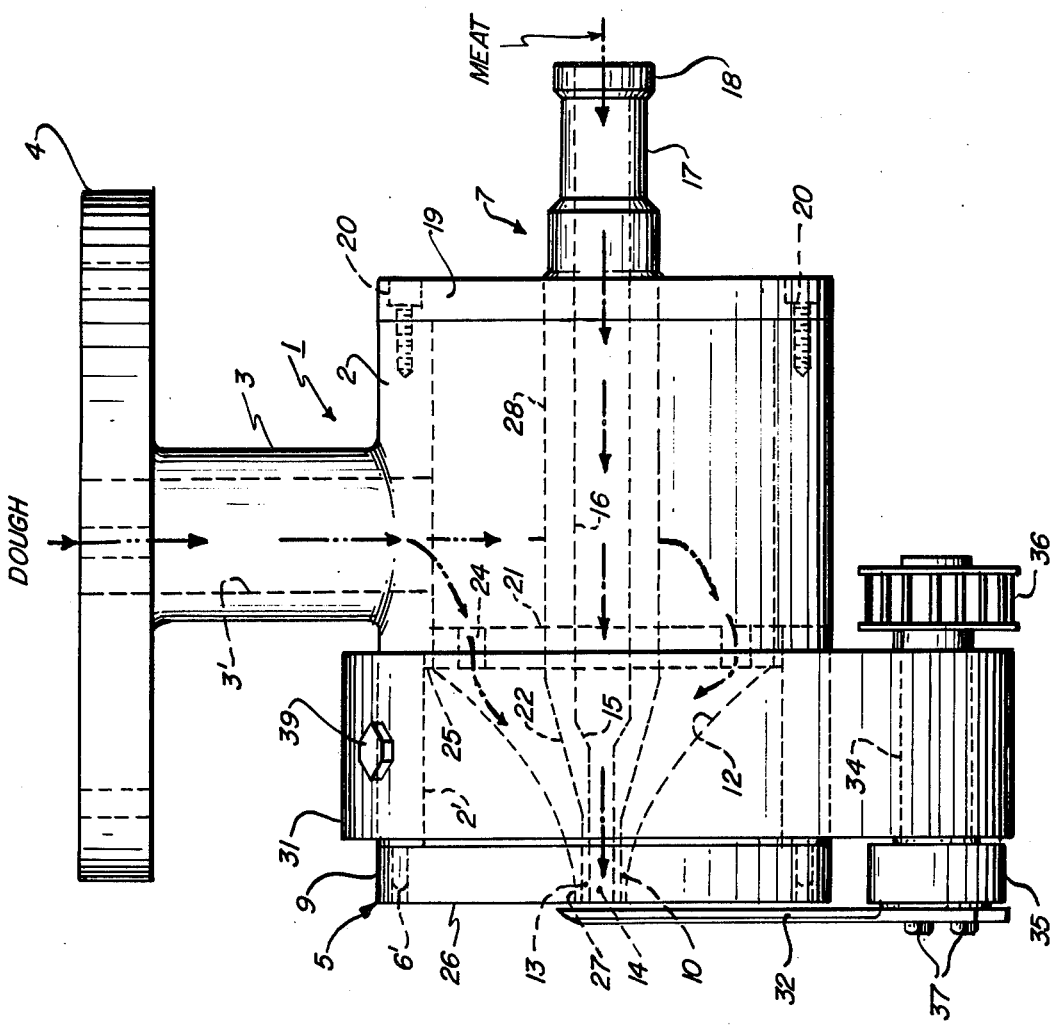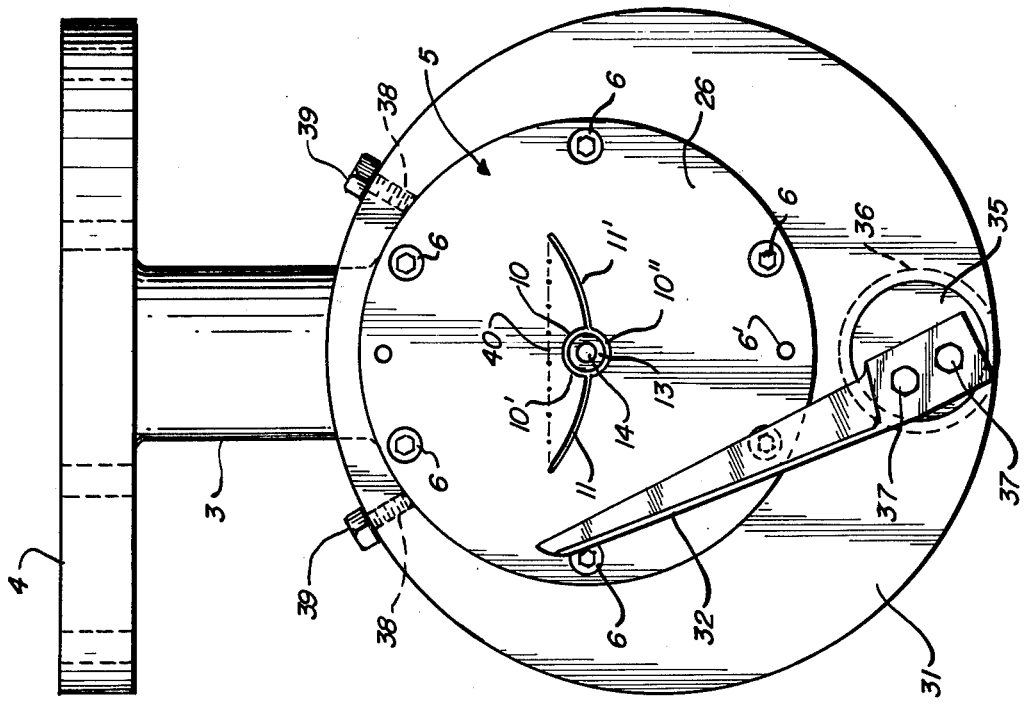

FOOD EXTRUSION DEVICE

BACKGROUND OF THE INVENTION

1. Field of the Invention

The invention relates to an extrusion device, and a method, for the production of a food product and it also relates to a novel food product as such. More particularly the invention concerns itself with the production by extrustion of a food product comprising a covering of a first food material such as dough and a filling of a second food material such as meat.

The invention lends itself to the fabrication of various food products of this kind but addresses itself more specifically to the automatic production of combination dough and meat products known as won tons. Typically won tons are made manually by wrapping a usually rectangular-shaped sheet of dough, consisting of flour and egg for example, around a filling of ground meat and the "patties" thus made are cooked or fried for eventual consumption. With the extrusion device and process according to the invention it is possible to extrude won tons or similar food products, in at least partially enclosed form together with the meat filling therein in a remarkably simple, rapid and inexpensive way. The result of this process—which is preferably supplemented by pre-cooking whereby the meat within the cover of dough is caused to jell or "set up"— is a food product of unique and useful structure, quite apart from its attractive appearance.

2. Description of the Prior Art

Extrusion devices for the production of food products, such as ravioli, made of a covering of a moldable food material and a meat filling therein are known per se. In producing these foods the meat filler is extruded through an inner nozzle and the moldable material is simultaneously extruded through an outer, surrounding nozzle. In a typical machine of this type the extrusion of the filler material through the inner nozzle is intermittently stopped and, in synchronism therewith, the ribbon of moldable material extruded through the outer nozzle is cut, for example, by a rotating wheel with circumferentially spaced blades therein, between the intermediate extrusions of the filler material through the inner nozzle. The food article produced by this process thus is in the form of a rectangular cover of moldable material, encasing a likewise substantially rectangular meat filler therein. Machines for carrying out this fabrication process are costly in manufacture and complex in operation.

OBJECTS AND SUMMARY OF THE INVENTION

It is one object of the invention to provide a novel and improved extrusion die, and a novel and improved method, for producing, in a simple and inexpensive way, a food article made of a covering of a moldable outer material and a meat filler therein.

It is another object of the invention to provide a novel and improved extrusion die, and a novel and improved method, for the production, in a simple and inexpensive way, of a food article, such as a won ton, which is in the form of a roll, with substantially closed ends, of one or more food materials.

A further object of the invention is the creation of a food product as such having a novel and improved structure and design which lends itself to automatic manufacture by extrusion and can thus be consistently reproduced, and which can moreover be readily grasped in processing and in consumption.

The foregoing and other objects of the invention are obtained briefly, by shaping the outer nozzle of the extrusion device, through which the dough is extruded, so as to form a central opening surrounding the inner nozzle through which the meat is extruded, on two sides thereof and also form two slots which extend outwardly from this central opening on the other two sides, respectively, and which are preferably curved in the same direction. In this fashion the extrusion device is built to cause more friction on the dough in the vicinity of the outer edges, that is, near the end of the slots, than in the center. Thi differential in frictional forces gives rise to a curling action of the extruded material about an axis substantially parallel to the straight line subtending the outer ends of the two slots and, as a consequence, the extruded material is formed into the general shape of a roll with substantially closed ends—or, otherwise expressed, into a shell-like body having a substantially cylindrical center portion closed by two substantially conical end portions. Moreover, since, as mentioned, the central opening in the outer nozzle from which the two slots extend, surrounds the inner nozzle on two sides thereof the meat filling is encased by a tube, or inner cover, of dough and the extruded meat with this inner cover of dough closely surrounding it, assumes the shape of an annulus extending centrally around the inner wall of the roll. When the roll with this annulus therein has been substantially formed, the extruded materials are automatically cut off in a plane closely adjacent to the front face of the extrusion head. The raw won tons or other food articles thus produced are, preferably, pre-cooked so that, in the process, the meat within the dough is caused to congeal and the article is readied for canning or freezing.

It is another aspect of the invention that the above food article is a food product of a unique and consistently reproducable structure. Moreover, a beneficial feature of the article is that the excess material remaining in the production by the two slots, of the two aforementioned conical end portions tends to result in the formation of corrugations or flutings along these portions which makes the food article easy to grasp during processing or in consumption.

BRIEF DESCRIPTION OF THE DRAWINGS

A preferred embodiment of the invention will now be described with reference to the accompanying drawings in which:

FIG. 1 is an elevational view of the extruding device in assembled condition;

FIG. 2 is a view of the assembled extruding device as seen from the left in FIG. 1;

DETAILED DESCRIPTION

1. Apparatus used

Figure 3:
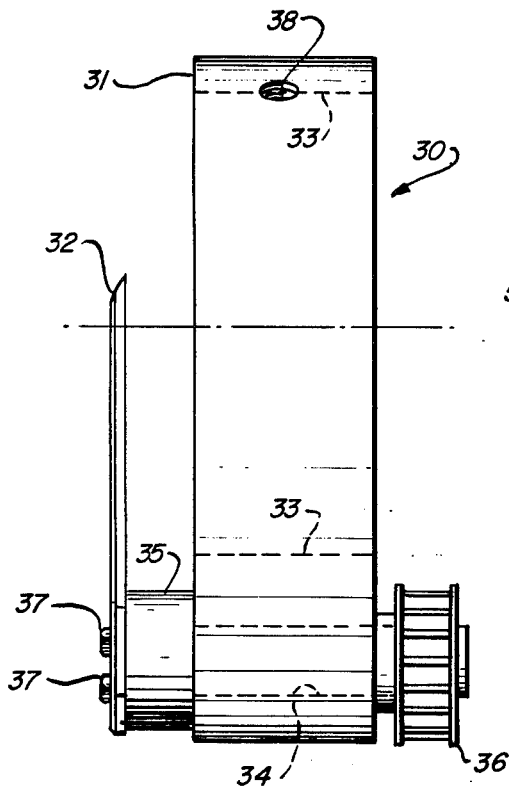
FIG. 3 is an elevational view of the knife assembly forming part of FIGS. 1 and 2.

The apparatus employed in the embodiment of the invention illustrated in the drawings will be described first. Referring to FIG. 1, number 1 denotes the housing of the extrusion device or die, which has a cylindrical portion 2 with a substantially cylindrical bore 2', and also has a tubular next portion 3 terminated by a flange 4 with mounting holes permitting the device to be mounted on a dough press or the like (not shown). The bore 3' in neck portion 3, through which the dough is fed by the press, communicates with the interior of housing portion 2.

Figure 4:
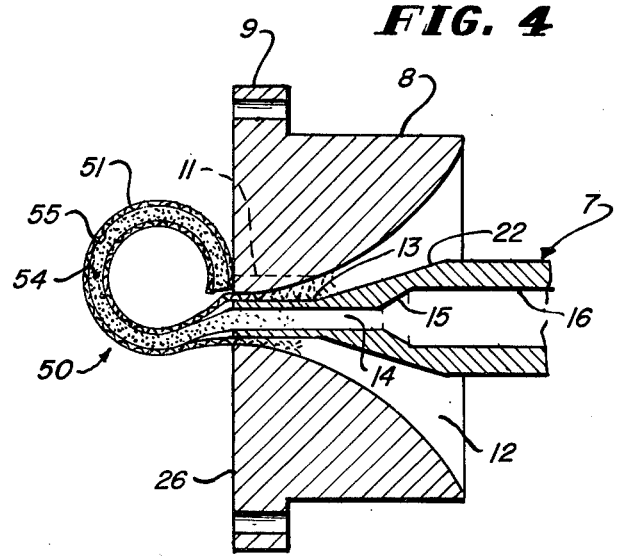
FIG. 4 is an elevational view, in section, of the extrusion head with the corresponding end of the meat supply tube extending therethrough; the figure also indicates the formation of the raw food article from the extruded materials adjacent the face of the extrusion head.

Extrusion head, or die head, 5, a cross-section of which may be seen in FIG. 4, is mounted on the left end of cylindrical housing portion 2 by means of bolts 6 and locating pins 6'. This extrusion head 5 has a main, cylindrical body portion 8 and a flange portion 9, the details of the face 26 of the latter being illustrated in FIG. 2. As mounting bolts 6 of die head 5 are tightened in the assembly of the device, the extreme right hand end of portion 8 of the die head is pressed against a shoulder 25 formed in bore 2' of housing portion 2.

Figure 5:
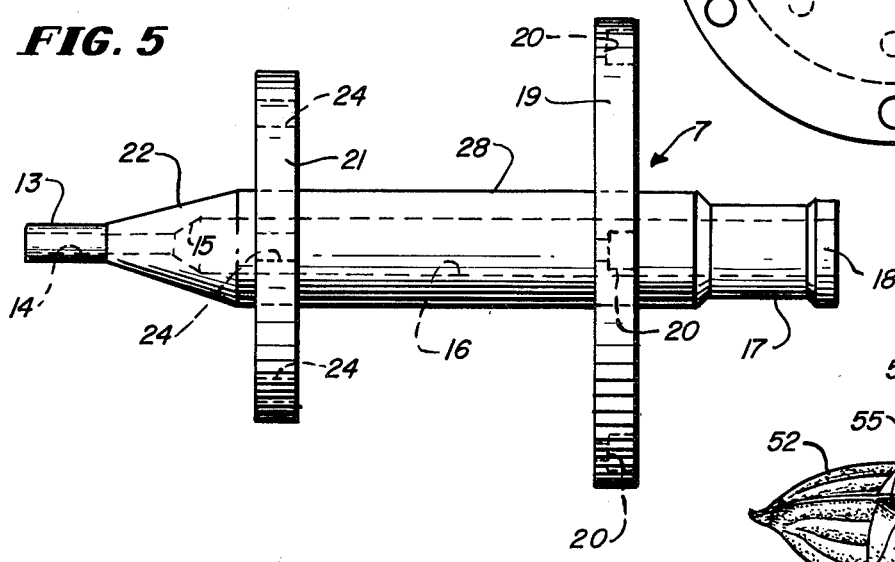
FIG. 5 is an elevational view of the meat supply tube.

Reference numeral 7, FIGS. 1, 4 and 5, collectively designates the meat supply tube which, for this purpose, may be connected at its extreme right end, to a meat press or the like (not shown), for example, by a connecting hose (also not shown) the end of which may be slipped over flange 18 and neck 17 at the right hand end of tube 7, FIG. 1. The extreme left end of tube 7 which is in the form of a cylindrical portion 13 of relatively small diameter and has a likewise cylindrical bore 14 extends through a central bore 27 in flange 9 of die head 5 and thus forms the inner nozzle of the extrusion device. As shown in FIG. 2, two upwardly curving slots 11 and 11' are also formed through flange 9 of the die head, these slots communicating at their inner ends with the two sides respectively of central cylindrical opening 10 which is left between the outer surface of cylindrical portion 13 of tube 7 and bore 27 in flange 9. The overall aperture of the outer nozzle thus formed consists, accordingly, of the upper and lower semicylindrical sections 10', 10'' of opening 10, and the two wing-shaped slots 11 and 11' which respectively join the two junctions between these semicylindrical sections and have approximately the same width as these sections.

Figure 6:
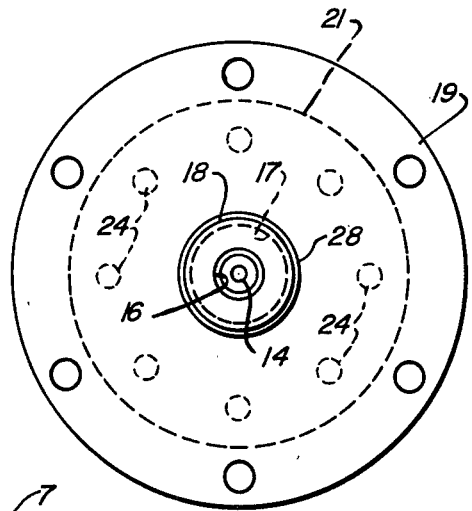
FIG. 6 is an end view of the meat supply tube as seen from the right in FIG. 1.

Reverting again to meat supply tube 7, the cylindrical bore 14 of this tube flares at 15 into a cylindrical bore 16 of somewhat larger diameter which extends all the way to the righthand or feed end of the tube. Fixedly mounted on, or integrally formed with cylindrical section 28 of tube 7, is a flange portion 19 by means of which tube 7, with the aid of bolts 20, is mounted on the right hand end of cylindrical housing portion 2, whereby the housing is also closed at this end. Adjacent the left end of cylindrical section 28, there is fixedly mounted on, or integrally formed with, tube 7 a disc 21 which, as will be seen from FIGS. 1 and 6, has cylindrical apertures 24 therethrough which are spaced circumferentially of the disc. These apertures serve to substantially uniformly distribute the dough entering cylindrical housing portion 2 through bore 3' of tubular neck portion 3 as it moves through these apertures 24 and the chamber formed between funnel shaped opening 12 in the cylindrical portion 8 of die 5 and the outer surface of conical section 22 of tube 7 towards central opening 10 and slots 11, 11'. Disc 21 has the further function of centering, as its periphery, tube 7 within bore 2' of cylindrical housing portion 2.

As illustrated in FIGS. 1, 2 and 3 a cutting knife 32 which serves to cut the extruded material after a won ton has been formed is removably mounted, by means of two bolts 37, on a flange portion 35 provided on the left hand end, FIGS. 1 and 3, of a shaft 34 rotationally supported in the bottom segment of a generally annular support member 31 forming part of an assembly 30. Mounted adjacent the right end of shaft 34 is a gear 36 which may be rotated by a driving gear or belt (not shown) to impart a swinging movement ot knife 32. Support member 31 has an eccentric cylindrical opening 33 of a diameter corresponding to the outside diameter of cylindrical portion 2 of the housing. In the assembly of the extrusion device, support member 31 is slipped over the left end of cylindrical housing portion 2 until member 31 assumes a position (shown in FIG. 1) axially of this housing portion in which knife 32 comes to lie in a plane immediately to the left of face 26 of die head 5. As can best be seen from FIG. 2, the spacing of knife 32 from face 26 is adjustable with the aid of clamping bolts 39 engaging corresponding tapped holes 38 in support member 31 and serving to secure this member on housing portion 2 in the desired axial position. It will be noted from the drawings that, with bolts 39 loosened, it is also possible to adjust the position of support member 31 circumferentially of housing portion 2. Because of the eccentricity of opening 33 in the annular support member 31 such a circumferential adjustment permits the angle of attack of knife 32 to be varied. In FIG. 3 bolts 39 have not been shown in order to expose one of the tapped holes 38 to view.

2. OPERATION

The operation of the extrusion device in the automatic production of won tons or similar food articles will now be described with particular reference to FIGS. 2, 4 and 7. From the description of the apparatus in the preceding section it will be appreciated that, as the dough is extruded through the generally arcuate or moon-shaped outer nozzle opening, FIG. 2, the frictional forces acting on the dough in the central portion 10 of this opening are smaller than at the ends thereof, that is, smaller than near the ends of slots 11, 11'. The consequence of this force differential is that, as shown in FIG. 4, the sheet of dough extruded through the composite outer nozzle opening is caused to curl in a direction determined by the moon-shaped slot or, more particularly, about an axis generally normal to the axis of the extrusion die, i.e. about an axis parallel to geometric line 40, FIG. 2, which subtends slots 11, 11'. As a result of this curling action the extruded material will assume the overall shape of a roll with closed ends or, otherwise expressed, the roughly shell-like shape or a cylindrical central portion flanked at each end by a conical end portion. Another consequence of this curling action is that the core of meat extruded through bore 14 of tube 7, closely surrounded by a tube of dough resulting from the extrusion of dough through central opening 10 of the outer nozzle, is forced into a—not fully closed—annulus extending along the inner peripheral wall of the aforementioned generally cylindrical center portion. In this fashion the meat is substantially encased by a tubular inner cover of dough which in turn is substantially encased by a generally shell-shaped outer cover of dough.

After the roll, with its closed ends, has been substantially formed the extruded material is severed, preferably automatically, by swinging cut-off knife 32 by means of gear 36 about the axis of shaft 34. The diameter of the roll formed, i.e., the size of the extruded food product can be regulated by appropriate timing of this swinging action.

Figure 7:
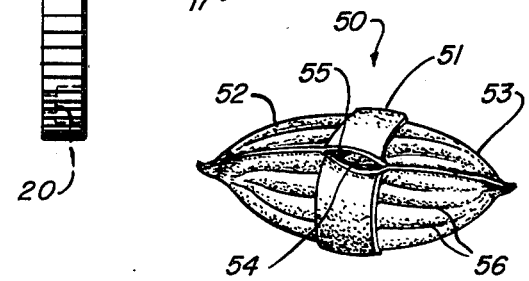
FIG. 7 is a perspective view of the completed food product.

The food product, 50, formed in this matter is shown in perspective in FIG. 7 and in this figure, 51 denotes the above cylindrically shaped center portion, and 52 and 53 designate the two generally conical end portions. The end of the annulus consisting of meat core 54 and the tube of dough 55 in which it is encased is visible in FIG. 7 as if in cross section, namely at the point where the cutting knife has sliced through both materials.

From FIG. 7 it will be noted then that, generally speaking, in the raw article resulting from the above described extrusion process, the meat is not fully sealed by the dough, because of the cut-off end of this annulus and because the overall shell produced still has an open mouth along the line where the extruded sheet of dough was severed by the knife. However, a precooking of the product—for, say, 5 minutes at approximately 190° F.—causes the dough to puff up and the meat to congeal so that the meat is kept from coming out of the tube. After this precooking step the food product is ready for canning or freezing.

Still referring to FIG. 7 it will be noted that the food product resulting from the proces described exhibits flutings or corrugations extending lengthwise of conical sections 52 and 53. These corrugations are caused by the excess material produced, during extrusion, due to the tapering off of the diameter of the shell in these conical sections; this excess material is automatically absorbed, as it were, by the corrugations formed. The aforementioned flutings along the end sections do not only enhance the eye appeal of the article—by simulating the appearance of a shell—but they also add to its utility in that these flutings make it easier for the article to be handled in processing and in consumption.

From the foregoing description it will be appreciated that the extrusion device, as well as the process, according to the invention make it possible to produce a food article of a predetermined, unique structure automatically, consistently and in a surprisingly simple and inexpensive way.

What I claim is:

1. In an extrusion device for the production of a food product comprising a covering of a first food material and a filling of a second food material, said device including a double nozzle having an inner nozzle portion of cylindrical shape and an outer nozzle portion and means for extruding said first and second food materials through said outer and inner nozzle portions, respectively, the improvement that said outer nozzle portion is shaped to form a central opening having two substantially semicylindrical sections and enveloping said inner nozzle portion on two sides thereof, symmetrically throughout the axial extent of said nozzle, and also form two slots curved in the same direction and outwardly extending from central opening on the other two sides, respectively, said substantially semicylindrical sections communicating therebetween with said outwardly extending curved slots and the thickness of said outwardly extending slots being approximately the same as the radial width of said substantially cylindrical sections so that the ensuing differential in the frictional forces acting on said first food material in said central opening and in said slots, respectively, gives rise to a curling action of the extruded first food material, and consequently also of said filling of said second food material, about an axis generally perpendicular of the axis of said nozzle, and that said curled first food material as extruded through the two sides of said central opening envelops said curled filling of the second food material on the outside and inside thereof, respectively.

2. An extrusion device for the production of a food product comprising a covering of a first food material and a filling of a second food material, said device including:

a housing having at one end thereof a portion with an outer cylindrical surface;

an extrusion head provided adjacent said housing portion and having a central opening and also two slots curved in the same direction and extending from said central opening on opposite sides thereof;

a tubulAr member extending through said central opening co-axially within said housing and in spaced relationship through the inner surface of said extrusion head, the space thus left between said inner surface of the extrusion head and the outer surface of said tubular member being of cylindrical shape throughout its axial extent and having an overall cross-sectional extrusion width larger than the thickness of each of said slots together with which it forms an outer nozzle portion, and the bore of said tubular member forming an inner nozzle portion;

means for supplying said first food material through said outer nozzle portion;

means for supplying said second food material through said inner nozzle portion;

a cylindrically shaped support member having therein an eccentric bore which slidably fits over said outer cylindrical surface as said support member is mounted on said housing portion;

a cut-off knife mounted for swinging movement in said support member;

and means for both axially and circumferentially adjusting the position of said support member relatively to said housing portion, thereby to vary the spacing of said knife from said extrusion head and vary the angle of attack of said knife, respectively.

3. An extrusion device as claimed in claim 2 wherein said extrusion head has a flange closing said housing at said one end thereof; wherein said tubular member has a mounting flange which closes said housing at the other end thereof; and wherein said tubular member, at a point intermediate said two ends, has a disc with apertures therein for distributing the supply of said first food material to said outer and inner nozzle portions.

* * * * *